United States Patent [19]

Loy et al.

[11] Patent Number: 5,321,102
[45] Date of Patent: Jun. 14, 1994

[54] MOLECULAR ENGINEERING OF POROUS SILICA USING ARYL TEMPLATES

[75] Inventors: Douglas A. Loy, Albuquerque, N. Mex.; Kenneth J. Shea, Irvine, Calif.

[73] Assignee: The United States of America as represented by the Department of Energy, Washington, D.C.

[21] Appl. No.: 967,081

[22] Filed: Oct. 26, 1992

[51] Int. Cl.$^5$ ............................................. C08L 83/02
[52] U.S. Cl. ........................................ 525/474; 528/43
[58] Field of Search ............... 423/702, 335; 427/534, 427/536, 539; 204/165; 210/500.22, 500.25, 500.26; 525/474

[56] References Cited

U.S. PATENT DOCUMENTS

| | | | |
|---|---|---|---|
| 4,022,152 | 5/1977 | Laufer et al. | 118/49.5 |
| 4,683,153 | 7/1987 | Mosser et al. | 428/65 |
| 4,900,845 | 2/1990 | Brisdon et al. | 549/352 |
| 4,908,135 | 3/1990 | Brisdon et al. | 210/654 |

OTHER PUBLICATIONS

Shea & Loy; *Aryl-Bridged Polysilsesquioxanes-New Microporous Materials;* Chemistry of Materials, vol. 1, No. 6, 1989; pp. 572-576. Month Unavailable.

"Template Removal form Molecular Sieves by Low-Temperature Plasma Calcination", Maesen et al., Journal of the Chemical Society-Faraday Trans., vol. 86, No. 23, pp. 3967-3970 (1990).

Shea et al., Chemistry of Materials, 572 (1989). Month Unavailable.

Shea et al., Mater Res. Soc. Symp. Proc., vol. 180, p. 975 (1980). Month Unavailable.

*Primary Examiner*—John Niebling
*Assistant Examiner*—Edna Wong
*Attorney, Agent, or Firm*—Timothy D. Stanley; George H. Libman

[57] ABSTRACT

A process for manipulating the porosity of silica using a series of organic template groups covalently incorporated into the silicate matrix. The templates in the bridged polysilsesquioxanes are selectively removed from the material by oxidation with oxygen plasma or other means, leaving engineered voids or pores. The size of these pores is dependent upon the length or size of the template or spacer. The size of the templates is measured in terms of Si-Si distances which range from about 0.67 nm to 1.08 nm. Changes introduced by the loss of the templates result in a narrow range of micropores (i.e. <2 nm). Both aryl and alkyl template groups are used as spacers. Novel microporous silica materials useful as molecular seives, dessicants, and catalyst supports are produced.

21 Claims, 3 Drawing Sheets

MOLECULAR ENGINEERING OF POROUS SILICA USING ARYL TEMPLATES

The United States Government has rights in this invention pursuant to Contract No. DE-AC04-DP00789 between the Department of Energy and American Telephone and Telegraph Company.

BACKGROUND OF THE INVENTION

1. Field of the Invention

This invention relates to molecular-engineered porous silica materials having micropores in a narrow size range. In addition, this invention relates to a process for the production of molecular-engineered porous silica materials having micropores in a narrow size range produced through the selective introduction of hydrocarbon templates into the silica structure and their subsequent removal from the solid material structure.

2. Description of the Prior Art

Porous silica has a variety of uses including desiccating water from closed packages, providing the solid phase for chromatographic separations, and acting as a support for catalysts used in numerous industrial processes. Silica is, by definition, an amorphous, glass-like material whose characteristics, including porosity, are primarily dependent upon the reaction and/or processing conditions used in its preparation. Porosity in silica gels is particularly important for the applications described above in which large surface areas are important for the processes being carried out. Large silica surface areas (meter-squared per gram of material) can translate into greater quantities of water or contaminant being adsorbed by silica desiccants, higher resolution separations of chemical mixtures through chromatography, and more efficient supported catalysts. However, the pore sizes in silica gels prepared by conventional techniques may range in size from macropores (>500 nm mean pore diameter) to micropores (<2.0 nm). Such broad and ill-defined porosity in silica prevents its application as a molecular sieve. Amorphous silica with the capability to perform molecular sizing in a similar fashion to zeolitic molecular sieves would be of enormous practical use considering the ease with which silica can be prepared in large monolithic shapes or in thin films.

Whereas porosity in zeolites arises from the crystalline arrangement of the network material, porosity in silica materials arises from interconnecting voids dispersed throughout the material. While traditionally the size of these voids can be manipulated by varying the reaction and processing conditions, the objective of the hydrocarbon template approach described here is to introduce porosity into the material based on the length of the hydrocarbon template or spacer.

It is known to prepare microporous aryl-bridged polysilsequioxanes by sol-gel processing of monomers such as bis-1,4-(triethoxysilyl)benzene and bis-4,4'-(triethoxysilyl)biphenyl, and their bis(trichlorosilyl) analogs. The materials produced by hydrolysis and condensation of these monomers result in rigid-rod organic spacers interspaced at regular intervals in the silicate-like framework. The xerogels produced upon subsequent processing of the gels have extremely high surface areas with porosities confined to the micropore range. The preparation of such aryl-bridged polysilsesquioxanes is previously described by the inventors in "Aryl-Bridged Polysilsequioxanes-New Microporous Materials," Chemistry of Materials, vol. 1, p. 572,(1989) and by Shea et. al. in "Aryl-Bridged Polysilsesquioxanes-New Microporous Materials, Better Ceramics Through Chemistry," Mater. Res. Soc. Symp. Proc., vol. 180, p. 975,(1990).

The present invention overcomes deficiencies of prior art silicas by providing molecular engineered porous silica materials having narrowly defined microporosity, allowing their use as molecular sieves, large surface area silica desiccants, efficient supported catalysts, and for high resolution separation of chemical mixtures through chromatography. This is accomplished by the manipulation of the porosity of silica using one or more of a series of organic template groups covalently incorporated into the silicate matrix. The templates in the bridged polysilsesquioxanes are selectively removed from the resultant material, leaving engineered voids or pores. The size of these pores is dependent upon the length or size of the template or spacer. The size of the templates is measured in terms of Si-Si distances ranging from about 0.67 nm to about 1.08 nm. Changes introduced by the loss of these templates are in the micropore range of >2 nm.

Although the previous work of the inventors as discussed above provided for microporous aryl-bridged polysilsesquioxanes, they have the disadvantage of having inconsistently sized micropores, resulting in ill-defined porosities. It has been found that the step of removal of the aryl templates from the material by means of oxidation such as through the use of oxygen plasma or ozone results in stable, well-defined porosity material capable of predictable performance for the uses described above.

It has further been found that alkyl-bridged polysilsequioxanes, although nonporous in the intermediate stage, become porous upon the carrying out of the inventive step of removal of the hydrocarbon templates. The removal of the alkyl templates is carried out in the same manner as the aryl templates described above, e.g., through oxidation using oxygen plasma or ozone. The use of alkyl-bridged polysilsesquioxanes using hexyl or nonyl alkyl groups may be advantageous over the aryl-bridged polysilsesquioxanes in that the precursors are more easily prepared. Further, it has been found to be advantageous to prepare non-porous material with the ability to treat it according to the invention at a later time or in the environment which it is to be used to render it porous. It has also been found that aryl-bridged polysilsesquioxanes can be made exhibiting limited or non-porosity until treatment according to the invention and, thus, exhibit the same advantage as alkyl-bridged polysilsesquioxanes.

SUMMARY OF THE INVENTION

The present invention relates to the manipulation of the porosity of silica using a series of organic template groups covalently incorporated into the silicate matrix. The templates in the bridged polysilsesquioxanes are selectively removed from the material leaving engineered voids or pores. The size of these pores is dependent upon the length or size of the template group or spacer. The size of the templates is measured in terms of Si-Si distances, ranging from about 0.67 nm to 1.08 nm. Changes introduced by the loss of the templates reside in the micropore range of <2 nm. The resulting porous silica material is useful for a variety of functions such as providing the solid phase for chromatographic separations, acting as a support for catalysts, acting as a high surface area desiccant, and acting as a molecular sieve. The ease with which porous silicas prepared according to the invention and formed into large monolithic shapes or thin films affords substantial advantages over the existing zeolitic molecular sieves.

An object of the invention is to provide a process for preparing a molecular-engineered porous silica material useful as a molecular sieve.

A further object of the invention is to provide a process for preparing a molecular-engineered porous silica material which can be easily formed into large monolithic shapes or thin films.

A still further object of the invention is to provide a process for preparing a molecular-engineered porous silica material useful as a high surface area desiccant.

A still further object of the invention is to provide a process for preparing a molecular-engineered porous silica material useful as an efficient support for catalysts.

A still further object of the invention is to provide a process for preparing a molecular-engineered porous silica material wherein the hydrocarbon-bridged polysilsesquioxane intermediate non-porous material may be treated according to the invention to become a porous silica material.

A still further object of the invention is to provide a porous silica material having a consistent micropore size within a narrow range.

Additional objects, advantages, and novel features of the invention will become apparent to those skilled in the art upon examination of the following description or may be learned by practice of the invention. The objects and advantages of the invention may be realized and attained by means of the processes particularly pointed out in the appended claims.

To achieve the foregoing and other objects, and in accordance with the purpose of the present invention, as embodied and broadly described herein, the present invention may comprise a method for rendering an organic template group-bridged polysilsesquioxane material porous by treating the material to selectively remove at least a portion of the organic template groups, thereby producing a microporous silica material.

BRIEF DESCRIPTION OF THE DRAWINGS

The accompanying drawings, which are incorporated in and form part of the specification, further illustrate the present invention and, together with the description, serve to explain the principles of the invention.

DETAILED DESCRIPTION OF THE INVENTION

The present invention provides a method to manipulate the porosity of silica using a series of organic template groups covalently incorporated into the silicate matrix. The templates in the bridged polysilsesquioxanes are selectively removed from the material leaving engineered voids or pores. The size of these pores is dependent upon the length or size of the spacer. The size of the templates is measured in terms of Si—Si distances ranging from 0.67 nm to 1.08 nm. Changes introduced by the loss of the templates are in the micropore range (i.e. <2 nm).

The templated materials, shown below, were prepared by the hydrolysis and condensation of bis(triethoxysilyl) monomers (prepared as below) where the spacer is the 1,4-phenyl, 4,4'-biphenyl, or the 4,4''-terphenyl template.

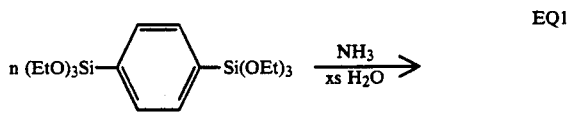

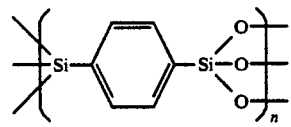

Formation of organic template-bridged polysilsesquioxane.

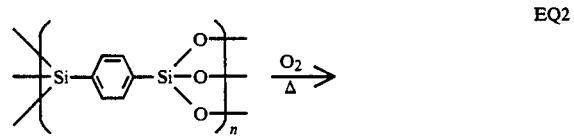

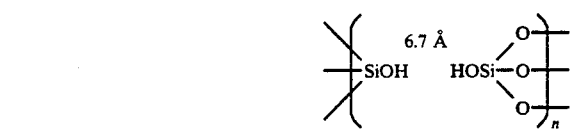

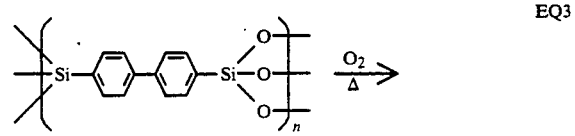

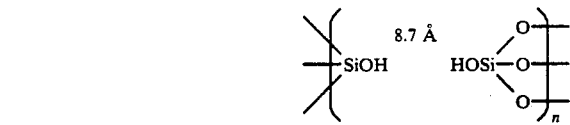

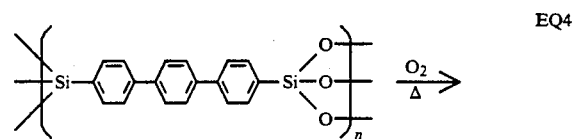

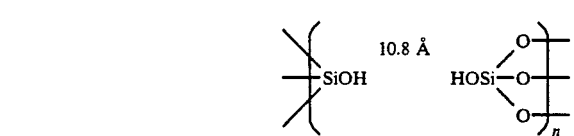

Oxidative removal of aryl templates generating micropores. Terminally functionalized linear alkanes ranging from two to twelve or more carbons in length may also be used as spacers. In preliminary studies, these materials were prepared as microporous xerogels with surface areas as high as 750 square meters per gram. By using microporous materials it is easier to determine the optimum technique for removing the aryl templates; the bulk samples lent themselves to solid state $^{29}$Si NMR and gas sorption porosimetry. Thermal gravimetric analysis of the phenyl-bridged polysilsesquioxane under air revealed that these materials are stable towards oxidation at above 400 degrees C. Thermal degradation at temperature this high would also be expected to introduce changes in the pore architecture of the resulting silica. Therefore, high temperature oxidations were not selected for the removal of the templates.

Low temperature (<100 degrees C) oxygen plasma treatment of the aryl-bridged polysilsesquioxanes was shown to efficiency remove the aryl-bridging groups after just a few hours. In a typical experiment, 100–500 milligrams of the ground polysilsesquioxane are placed into a RF inductively coupled oxygen plasma (<1 torr; commercial coal ashers can also be used for the treatment). Removal of the hydrocarbon component were monitored continuously by the presence of carbon monoxide emission lines. Once the carbon monoxide is gone, only silica remains. Alternatively, samples were removed at regular intervals for evaluation by infrared spectroscopy.

Figure 1:
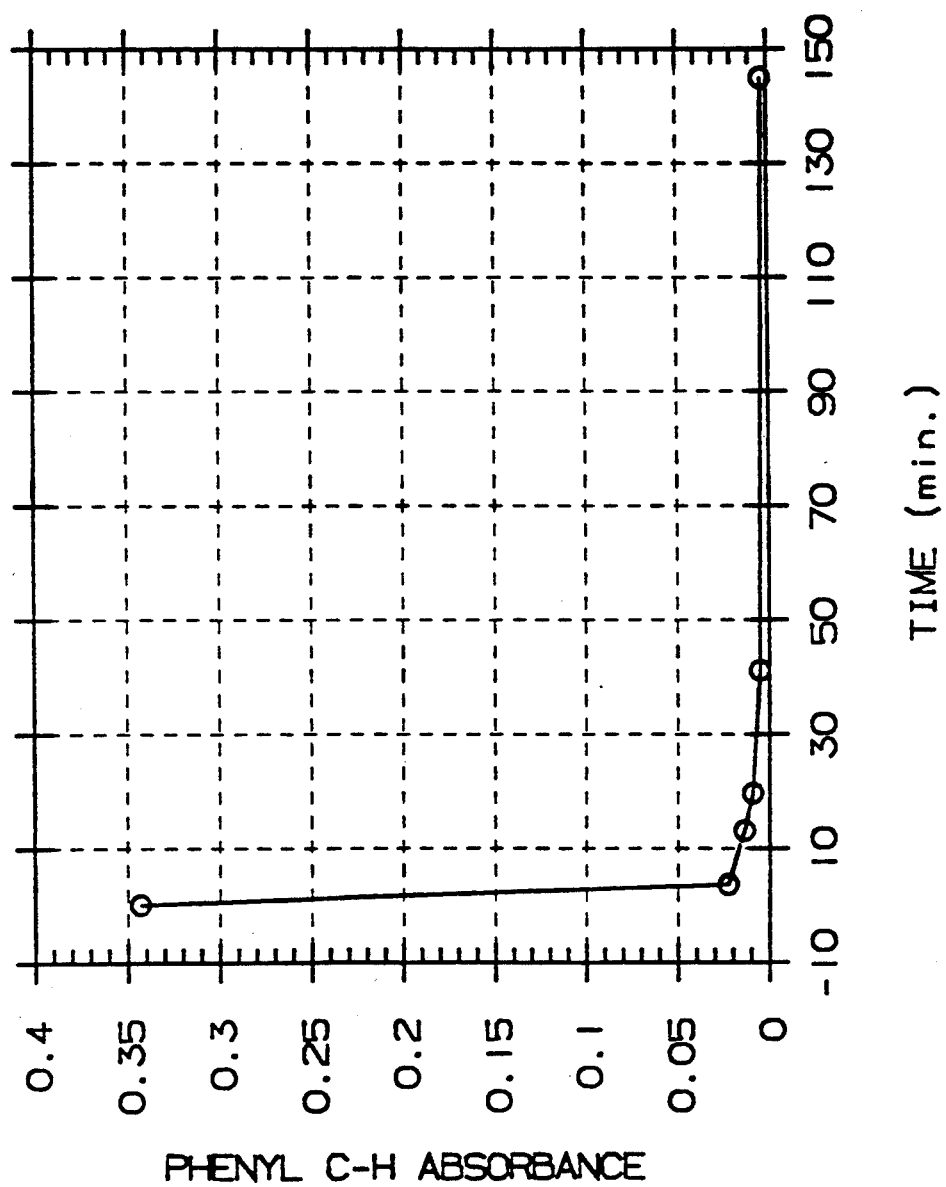
FIG. 1 is a chart illustrating the loss of Phenyl C-H band in infrared over time while treating an aryl-bridged polysilsesquioxane with oxygen plasma.

Referring to FIG. 1, there is shown the change in C-H (aromatic) stretching absorbance from the bridging phenyl group as a function of time in the oxygen plasma. The graph indicates that within 15 minutes, the phenyl group is almost completely oxidized. Plasma treatment is continued for several hours more to insure complete conversion.

Figure 2A:
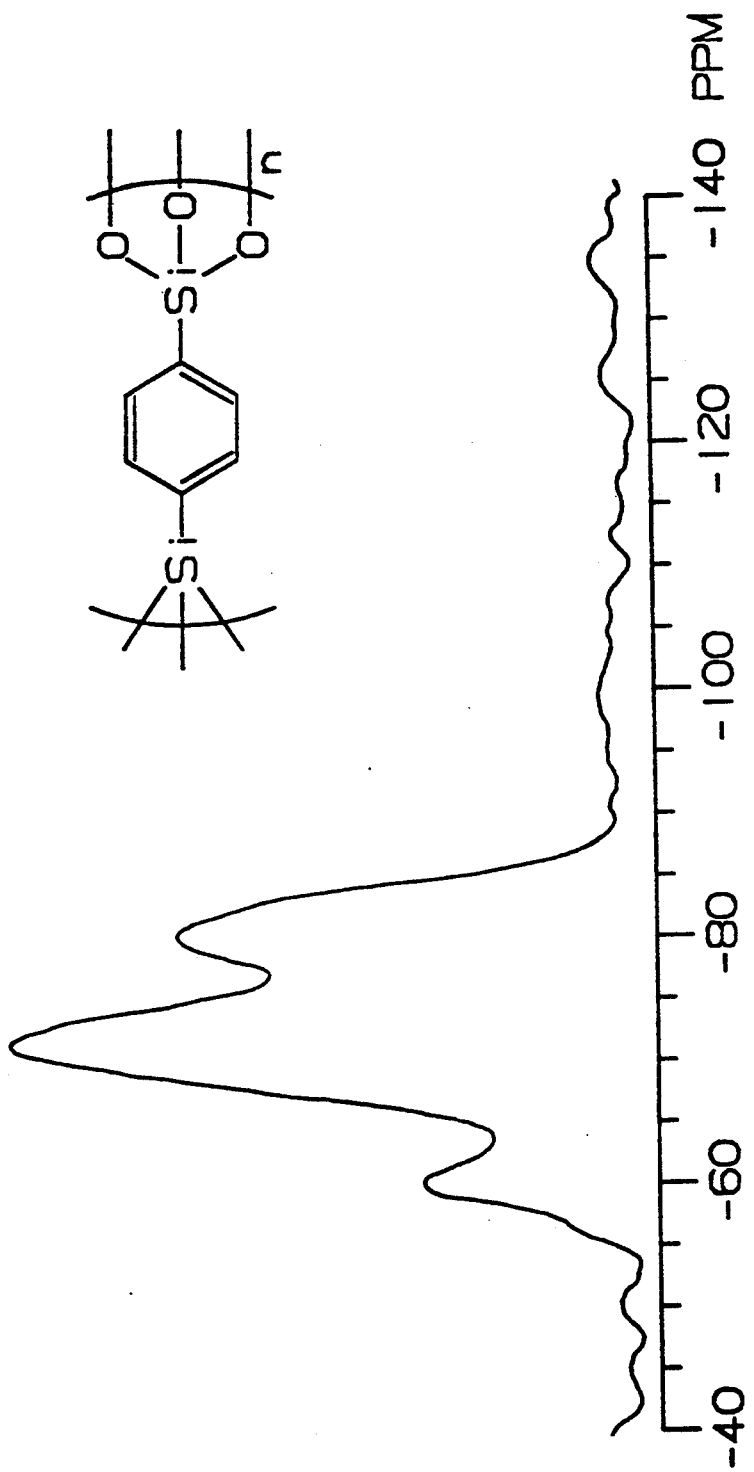
FIG. 2A is a chart illustrating the NMR spectra of phenyl-bridged polysilsesquioxane before oxygen plasma treatment.
Figure 2B:
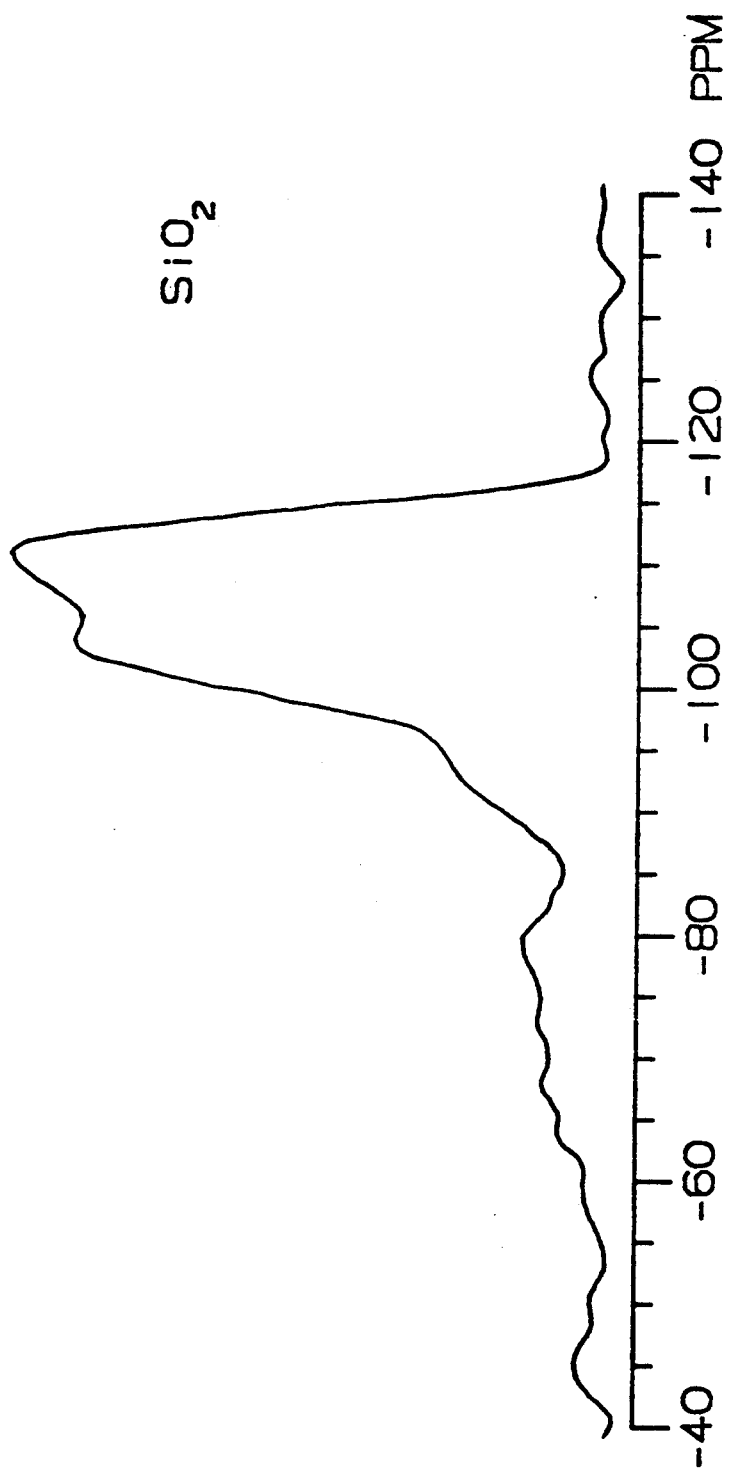
FIG. 2B is a chart illustrating the NMR spectra of phenyl-bridged polysilsesquioxane after oxygen plasma treatment to remove the organic templates.

Referring to FIGS. 2A and 2B, solid state $^{29}$Si NMR spectra for phenyl-bridged polysilsesquioxane before and after oxygen plasma treatment, respectively, reveal the near-quantitative loss of the phenyl groups by the loss of silsesquioxane (Ph-Si) resonances near −75 ppm, and the appearance of silica (SiO$_2$)resonances near −100 ppm.

In order to clarify the effect of the templates on porosity, dense silica thin films doped with the aryl templates were prepared which have little or no porosity. These films were prepared by co-condensing tetraethoxysilane and the bis(triethoxysilyl)aryl monomers to form a solution of copolymer. Quartz slides were dip coated with the polymer to form thin films. After thermally curing on surface acoustic wave devices, the films were characterized by gas sorption. Once the pore structure of the templated films was known, a low temperature oxygen plasma was used to remove the template leaving only silica gel. Again, the sorption characteristics of the treated film can be determined to identify any new porosity.

Alkyl-bridged polysilsesquioxane materials have also been prepared using sol-gel processing. It was discovered that non-porous bulk materials could be prepared under basic conditions (NaOH, in EtOH) when the bridging group was longer than 9 carbons(nonyl-bridged polysilsesquioxane). Similarly, non-porous materials could be prepared under acid conditions (HCl,EtOH or THF) when the bridging group was six carbons or longer(hexyl-bridged) to afford a porous silica whose porosity is solely dependent upon the removal of the template. For example, plasma oxidation of a non-porous decyl-bridged polysilsesquioxane (surface area=1.8 square meters per gram) afforded a mesoporous silica with a surface area of over 240 square meters per gram. Unlike polysilsesquioxanes with rigid (aryl or ethynyl spacer) bridging groups, these alkyl bridged polysilsesquioxanes have flexible spacers; collapse of porosity in these materials may arise from nanophase separation.

Ethynyl or acetylene bridged polysilsesquioxanes are an additional class of templated polymers which can be plasma treated to afford porous silica. However, due to the relative ease with which the acetylenic group can be hydrolytically cleaved from the silicon atom, the templates could conceivably be dissolved washed from the material with an aqueous base, thus entirely avoiding the use of an oxygen plasma. This technique has yet to be demonstrated.

We claim:

1. A method for rendering organic template group-bridged polysilsesquioxane material porous comprising:
    (a) treating the organic template group-bridged polysilsesquioxane material with an oxidizing agent to oxidize at least a portion of the organic template groups; and
    (b) removing the oxidation products of said treatment step to form micropores in the material resulting in a microporous silica material product.

2. The method of claim 1, wherein the organic template group of the organic template group-bridged polysilsesquioxane material is an aryl template group.

3. The method of claim 2, wherein the aryl template group of the organic template group-bridged polysilsesquioxane material is selected from the group consisting of 1,4-phenyl, 4,4'-biphenyl, and 4,4''-terphenyl.

4. The product of the process of claim 3.

5. The method of claim 1, wherein the organic template group of the organic template group-bridged polysilsesquioxane material is an alkyl template group.

6. The method of claim 5, wherein the alkyl template group of the organic template group-bridged polysilsesquioxane material is a terminally functionalized linear alkane group within the range of from two to twelve carbon atoms in length.

7. The method of claim 1, wherein the diameter of the micropores in the microporous material product correspond to the size of the template group of the organic template group-bridged polysilsesquioxane material is determined by the distance between the silicon atoms to which the organic template group is bonded.

8. The method of claim 7, wherein the organic template groups of the organic template group-bridged polysilsesquioxane material are within the range of about 0.67 to about 1.08 nm. in diameter.

9. The method of claim 7, wherein the micropores in the microporous material products are less than 2 nm. in diameter.

10. The method of claim 1, wherein the oxidizing agent is selected from the group consisting of oxygen plasma and ozone.

11. The method of claim 10, wherein said oxygen plasma treatment is carried out at about 100 degrees C.

12. The product of the process of claim 11.

13. The method of claim 11, wherein said ozone treatment is carried out at about room temperature.

14. The method of claim 1, wherein the organic template group of the organic template group-bridged polysilsesquioxane material is selected from the group consisting of an ethynyl template group and an acetylene template group.

15. The method of claim 14, wherein the oxidizing agent is selected from the group consisting of oxygen plasma and ozone.

16. The product of the process of claim 1.

17. A microporous engineered polysilsesquioxane derivative silica material having micropores of a substantially constant diameter, said micropores being less than 2.0 nm. in diameter, said silicate material being substantially devoid of organic template groups.

18. The material of claim 17, wherein said material exhibits a surface area of about 240 square meters per gram.

19. A method for producing microporous silica materials having a substantially constant diameter, wherein bis(triethoxysilyl) monomers having an aryl template group selected from the group comprising 1,4-phenyl, 4,4'-biphenyl, and 4,4''-terphenyl are hydrolyzed and condensed to form aryl template group-bridged polysilsesquioxane materials, the improvement comprising treating said polysilsesquioxane materials with an oxygen plasma at about 100 degrees C. for a time period sufficient to oxidize and remove said aryl template groups.

20. A method for rendering ethynyl or acetylene template group-bridged polysilsesquioxane material porous comprising:
(a) treating the template group-bridged polysilsesquioxane material with an aqueous base to dissolve the template groups therefrom; and
(b) washing the dissolved template groups from the template group-bridged polysilsesquioxane material to form a microporous product.

21. The method of claim 20, wherein said treatment step comprises treating said material with an aqueous base, thereby dissolving and washing said templates from said material.

* * * * *